United States Patent [19]

Hnizdor

[11] Patent Number: 4,965,957

[45] Date of Patent: * Oct. 30, 1990

[54] TANDEM DOUBLE OFFSET FISHHOOK

[76] Inventor: Thomas A. Hnizdor, 9164 Brady, Redford, Mich. 48239

[*] Notice: The portion of the term of this patent subsequent to Apr. 10, 2007 has been disclaimed.

[21] Appl. No.: 464,157

[22] Filed: Jan. 12, 1990

Related U.S. Application Data

[63] Continuation-in-part of Ser. No. 310,965, Feb. 16, 1989, Pat. No. 4,914,852.

[51] Int. Cl.⁵ .............................................. A01K 83/00
[52] U.S. Cl. ................................................. 43/44.82
[58] Field of Search ........................... 43/44.82, 43.16

[56] References Cited

U.S. PATENT DOCUMENTS

| | | |
|---|---|---|
| 471,543 | 3/1892 | Haviland . |
| 822,822 | 3/1908 | Henzel . |
| 1,283,718 | 11/1918 | Ford . |
| 1,875,182 | 8/1932 | Southwell . |
| 2,534,469 | 12/1950 | Moore . |
| 2,733,539 | 2/1956 | Kelly . |
| 2,800,740 | 7/1957 | Glaze . |
| 3,483,651 | 12/1969 | Borger ................................ 43/42.48 |
| 4,280,296 | 7/1981 | Volenec . |
| 4,914,852 | 4/1990 | Hnizdor ............................. 43/44.82 |

OTHER PUBLICATIONS

Tandem Streamers-Ray Salminen-Fly Fisherman Magazine, dated-Jun. 1986.
A Look at Hooks-Lefty Kreh-Fly Fisherman Magazine, dated-Mar. 1987.
Flies or Lures?-John Gierach-Fly Fisherman Magazine, dated-May 1986.
Trolling Maine Streamers-Al Raychard-Fly Fisherman Magazine, dated-Jun. 1986.

Primary Examiner—Richard K. Seidel
Assistant Examiner—James Miner
Attorney, Agent, or Firm—Basile and Hanlon

[57] ABSTRACT

A tandem double offset fishhook includes first and second hooks, each having a shank, an offset bend curving concavely from one end of the shank and a point at the end of the bend. The shanks of the first and second hooks are of equal lengths. The offset bends of the first and second hooks are disposed at equal inverted angles on opposite sides of a vertical plane through the first and second shanks to generate forces which cause the fishhook to rotate and spin as it is drawn through the water while being reeled in. In one embodiment, the first and second shanks are integrally formed from a single elongated wire, with the eye disposed between the ends of the shank at one end and the shanks disposed side-by-side in parallel. A flotation member may be mounted about the shanks of each hook and is formed to fit between the hook points of the first and second hooks.

6 Claims, 2 Drawing Sheets

TANDEM DOUBLE OFFSET FISHHOOK

CROSS REFERENCE TO CO-PENDING APPLICATION

This applicaton is a continuation-in-part of co-pending application entitled "Tandem Double Offset Fishhook", U.S. application Ser. No. 07/310,965, filed Feb. 16, 1989, now U.S. Pat. No. 4,914,852, in the same name of Thomas A. Hnizdor, the named inventor of the subject application.

BACKGROUND OF THE INVENTION

Field of the Invention

This invention relates, in general, to fishhooks.

One of the most important pieces of fishing tackle is the fishhook which is the physical connection to a fish when the fish is caught. Fishhooks are available in many different sizes, shaped and weights for catching different types of fish, for use in different water conditions and for use with different fishing techniques.

A typical fishhook includes an eye, a shank which is the straight portion extending from the eye, a bend which is the curved portion at the end of the shank, a barb and a point formed on the outermost end of the bend.

Double or multiple fishhooks include two or more individual hooks, each having a bend, barb and point, which are angularly spaced at the end of a common shank or multiple aligned shanks. The purpose of such multiple hooks is to improve the secure attachment of bait to the hook or to increase the likelihood of catching a fish striking the hook.

Tandem hooks are also known in which two hooks are rigidly connected end-to-end by attaching the eye or shank of one hook to the shank of another hook. In these types of fishhooks, it is common for the bends of both hooks to be co-planar with each other and the shank or shanks of the hooks. Even if the bends extend in opposite directions from the shafts, as in U.S. Pat. No. 4,280,296, the typical tandem fishhook has such bends, barbs and points disposed in a co-planar arrangement with the shanks of both fishhooks. This is to prevent any spinning of the hook and to enable a straight pull of the fishhook through the water.

In fly fishing, an artificial fly is attached to a fishhook or hooks by winding fur, feathers, tinsel, hair or synthetic materials about the hook. Some local fishing ordinances ban the use of blades or spinners on flies which create a spinning action of the fly and hook as it is drawn through the water while being reeled in. Most commercially available fishhooks, with the bends, barbs and points disposed in the same plane as the shanks create no spinning action. While offset bends are noted for their spinning action and are thus ignored or minimally used, they do cause a spinning action of the fishhook. However, due to the single hook employed with an offset bend, such spinning action is uncontrolled, that is, it is intermittent or has a non-constant arc of rotation. As such, such offset bends have not been useful in presenting a fly acting as a dying bait fish which is attractive to a fish.

Thus, it would be desirable to provide a fishhook for use in fly fishing which creates a controlled spinning action action of the fishhook as the fishhook is being reeled in through the water without the use of additional attachments or spinners. It would also be desirable to provide a fishhook which creates a spinning action which can be simply constructed using presently available fishhooks and/or fishhook designs.

SUMMARY OF THE INVENTION

The present inventon is a tandem double offset fishhook particularly suited for fly fishing which generates a spinning action of the fishhook and fly as the fishhook is reeled in through the water.

The fishhook includes an eye and a first hook. The first hook is formed with a first shank having a first predetermined length extending from and connected to the eye, a first offset-shaped bend curving concavely from one end of the first shank and terminating in a first point. The fishhook also includes a second hook including a second shank rigidly positioned with respect to the first hook and having a second predetermined length, a second offset-shaped bend curving concaving from the second shank and spaced from the first offset bend of the first shaft and terminating in a second point. The first and second offset bends of the first and second hooks, respectively, are disposed at equal, inverted angles on opposite sides of a vertical plane through the first and second shanks.

In a preferred embodiment, the fishhook of the present invention is integrally formed of a single piece wire shaped such that the first and second shanks are disposed in parallel side-by-side position with the eye formed between one end thereof and the bends extending outward from the opposite ends of each of the first and second shanks in an offset, counterposed manner. Alternately, the eye or shank of the second hook is rigidly connected to the shank of the first hook such that the first and second shanks are disposed substantially co-linearly in a rigid, unitary structure. Further, in yet another embodiment, the shanks of the first and second hooks are of equal lengths.

By constructing the tandem, double offset fishhook of the present invention with the offset bends disposed at equal, inverted angles on opposite sides of a vertical plane through the shanks of the fishhook, with the gap, offset gap, offset angle and bend shape of each hook being identical and counterposed, the bends under the influence of the water as the fishhook is drawn through the water creates a spinning action causing rotation of the fishhook in a controlled, consistent manner. This represents an attractive object for a fish to induce the fish to strike the hook. Further, since the spinning action is imparted solely by the fishhook itself, no additional spinners or blades are required to impart such a spinning action.

In another embodiment, the shanks of the first and second hooks are of equal length. A flotation member formed of a buoyant material is mounted about the two shanks and extends from the eye of the shanks to the start of the offset bends of the shanks. The flotation member is sized to fit between the hook points of the two offset bends. In this manner, the fishhook rides is the surface of the water; but still spins when reeled in or in a water current flow due to the tandem offset bends.

The tandem double offset fishhook of the present invention is of simple construction and may be formed using fishhooks with conventional shanks, bends, barbs and points. Further, the tandem, double offset fishhook of the present invention may be constructed with shanks of varying lengths, different gap sizes, different shank diameters, different materials, and with a variety of different barbs and points so as to be adaptable for use in varying fishing conditions, for catching different types of fish and for use with different fishing techniques.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
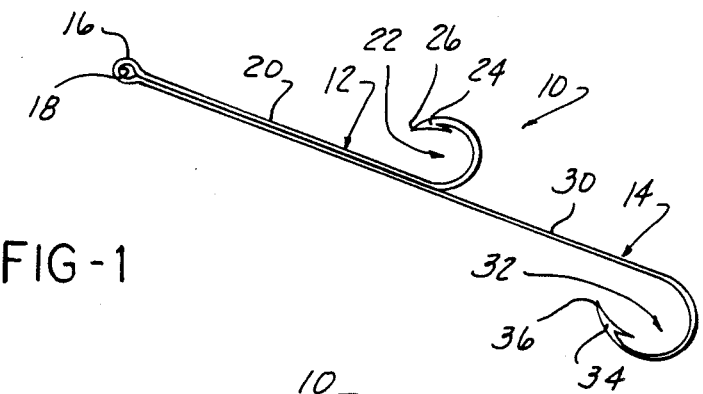
FIG. 1 is a perspective view of the tandem double offset fishhook constructed in accordance with the teachings of one embodiment of the present invention.

Throughout the following description and drawing, an identical reference number is used to refer to the same component shown in multiple figures of the drawing.

Referring now to the drawing, and to FIGS. 1, 2, 3 and 4 in particular, there is illustrated a tandem double offset fishhook 10 which is useful in fly fishing for creating a controlled spin of the hook 10 as it is drawn through the water while being reeled in. It is particularly suited for fly fishing in which a fly is dressed or tied around the fishhook to attract fish.

The fishhook 10 is a rigid, unitary structure including a first fishhook portion 12, a second fishhook portion 14 and an eye 16. Each of the fishhook portions 12 and 14 are identically constructed; but are arranged at different angles with respect to each other as described hereafter.

In a preferred embodiment, the tandem double offset fishhook 10 if formed of a unitary, single piece wire bent or formed to shape shown in FIG. 1 in which the first hook 12 is arranged side by side in parallel with the second hook 14 and interconnected by the eye 16. The eye 16 has a circular shape with an internal aperture 18 for attachment to a swivel, not shown, which provides connection to a fishing line. The eye 16 may have any shape conventionally employed in fishing hooks, such as looped, tapered, ball, open, closed, turn-down, straight or turned-up. The eye 16 may also be formed of separate, overlapping arranged eyes, each connected to one of the first and second hooks 12 and 14. Further, the space between the adjacent portions of the shanks 20 and 30 arw welded or otherwise secured together to prevent separation.

The first hook 12 includes a first shank having a generally straight shape extending from the eye 16 at one end. The first shank 20 has any predetermined length suitable for a particular fishing application, such as those conventionally sold as "1", "1X", "2XL", etc. These numbers are size designations corresponding to the length of shanks of fishhooks.

As is conventional, the first hook 12 also includes a bend, a barb and a point. The bend denoted by reference number 22 is a bottom curved portion integrally formed at the end of the shank 20 which curves in a generally U-shaped concave manner back towards the opposite end of the shank 20. The bend 22 may have any generally known shape, such as Sproat, Limerick or Perfect. These terms define the shape or sharpness of the curved portion of the bend 22.

In order to understand and clarify the present features of the present invention, a brief description of common bend shapes and orientations will now be described. In a conventional fish hook with any one of the above-listed bend shapes, the bend forms a plane with the shank of the fishhook such that barb and point at the end of the bend lie in the same plane as the shank. Offset bends are also known in which the curved portion forming the bend 22 curves angularly away from the horizontal, longitudinal axis of the shank and curves concavely toward the opposite end of the shank at an angle. This creates a convoluted curve somewhat resembling a twist in the bend which is disposed at a predetermined angular orientation with respect to a vertical plane extending through the shank, as described hereafter. The bend may be formed such that the point is parallel or non-parallel with the shank and lies in or extends out of a horizontal plane through the shank.

The fishhook 12 also includes a barb 24 of any generally known configuration and size. The end of the barb 24 which forms the termination of the fishhook defines a first hook point 26. The fishhook 12 may also be barbless. Any conventional point may be employed in the fishhook 10 of the present invention, such as round, blunt, needle, hollow, spear, corkscrew. All of these convetionally known point configurations are included in the general term "point" as used in the description of the present invention.

Figure 2:
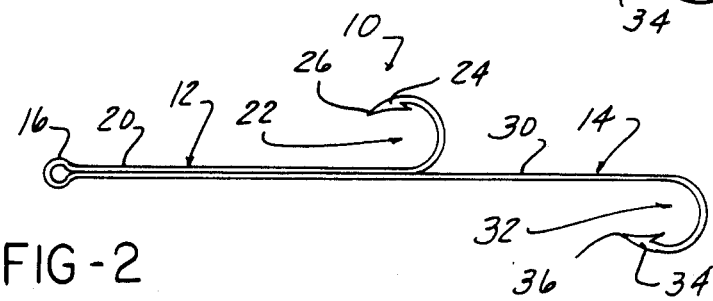
FIG. 2 is a plan elevational view of the tandem double offset fishhook shown in FIG. 1.
Figure 3:
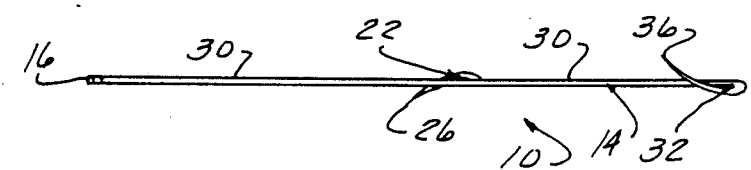
FIG. 3 is a front elevational view of the fishhook shown in FIG. 2.
Figure 4:
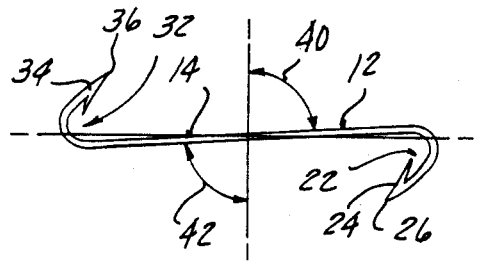
FIG. 4 is an enlarged right-hand end view of the fishhook shown in FIG. 3.
Figure 5:
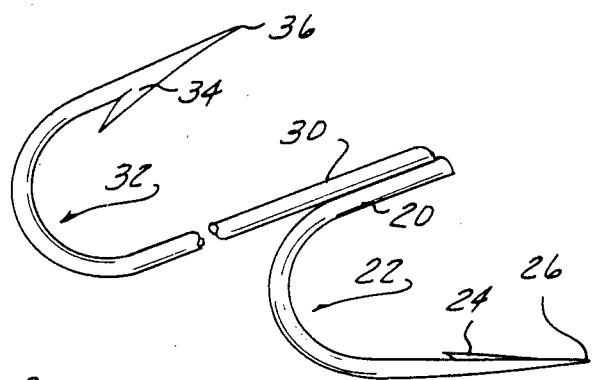
FIG. 5 is a partial, enlarged perspective view showing the shape and angular orientation of the bend portions of each of the fishhooks of the tandem double offset fishhook shown in FIG. 1.

The second hook 14 of the tandem double offset fishhook 10 of the present invention is substantially identical to the first hook portion 12. That is, the second hook 14 includes a shank 30, a bend 32, a barb 34 and a point 36. As can be seen in FIGS. 1, 2 and 3, the shank 30 of the second hook 14 has a second length, preferably longer than the length of the first shank 20 of the first hook portion 12. The bottom curved bend 32 in the second hook 14 is also offset and has the same configuration and shape as the bend 22 in the first hook 12. However, the angular orientation of the bend 32 in the second hook 14 is disposed at an equal angle but in an opposite, inverted direction from the bend 22 of the first hook 12 with respect to a vertical plane through the shank 12 and 14 as shown in FIG. 4. Otherwise, the shape of the barb 34 and the point 36 and the size of the gap between the point 36 and the shank 14 are identical to the corresponding elements for the first hook 12.

Thus, the first, offset, bottom curved bend 22 in the first hook 12 curves concavely from a first plane formed by the first and second shanks 20 and 30, respectively. The curving forms a second plane at an angle to the first plane and causes the bottom curved bend of the first offset bend 22 to be on one side of the first plane and the first hook point 26 to be on the opposite side of the first plane.

The second, offset, bottom curved bend 32 formed in the second hook 14 curves concavely from the first plane, with the curving forming a third plane at an angle to the first plane symmetrically opposite to the second plane relative to the first plane and causing an opposite planar effect with the first offset bend 22. The bottom curved bend of the second offset bend 32 is on one side of the first plane and the second hook point 36 is on an opposite side of the first plane through the shanks 20 and 30.

The angles of the second and third planes formed by the bottom curved bends of the first and second hooks 12 and 14, respectively, relative to the first plane are equal. Likewise, a gap space between the first hook point 26 and the first shank 20 is equal to a gap space between the second hook point 36 and the second shank 30.

As shown in FIG. 4, the angke of the bend 22 denoted by reference number 40 from a vertical plane extending through the aligned shanks 12 and 14 is equal to the angle denoted by reference number 42 between the bend 32 of the second hook portion 14 with respect to the same vertical plane. The angle may vary as desired to provide any amount of spinning action. Typically, an angle of between 10° to 45° for the bends 22 and 32, respectively, is preferred.

In use, after the fishhook 10 has been attached to a fishing line and cast into the water, the action of reeling in the fishhook 10 causes the water to exert forces on the offset bends 22 and 32 which, due to the curved angular orientation of the bends 22 and 32 creates a spinning action causing rotation of the fishhook 10 about the eyelet 16 in a clockwise or counterclockwise direction depending upon the orientation of the bends 22 and 32 from the shanks 20 and 30. This causes the fishhook 10 to spin creating a more attractive appearance to lure a fish to strike the fishhook 10. It should be noted that the length of the shanks 20 and 30 of the first and second hook portions 12 and 14, respectively, determines the overall diameter of the spin of the fishhook 10. The longer length shank, such as shank 30, will generally control the diameter of the spin of the fishhook 10.

Figure 6:
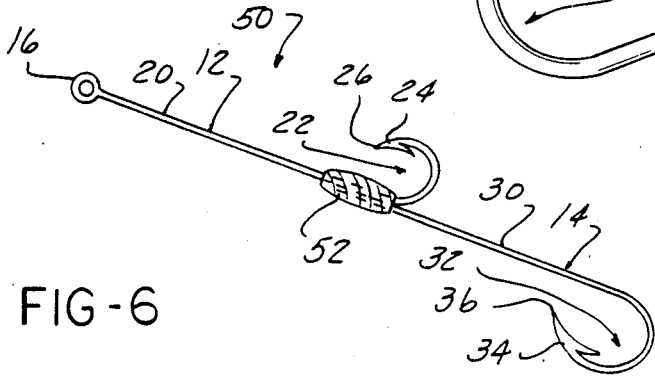
FIG. 6 is a perspective view showing another embodiment of the fishhook of the present invention.

In an alternate embodiment of the fishhook of the present invention shown in FIG. 6, the fishhook 50 may be constructed of two separate hooks of generally conventional configuration. In this embodiment, the eye or the shank portion 30 of a second hook 14 is rigidly connected to the shank portion 20 of a first hook 12 generally adjacent the beginning of the bend portion 22 of the first hook 12 as shown in FIG. 6. Threads 52 may be wound about the joinder of the shank 30 to the shank 20 to secure the shanks 20 and 30 rigidly together. Alternately, a separate rigid wire, not shown, may be secured to the shank 20 at one end and to the eye of the second hook 14 to rigidly connect the second hook 14 to the first hook 12.

Figure 7:
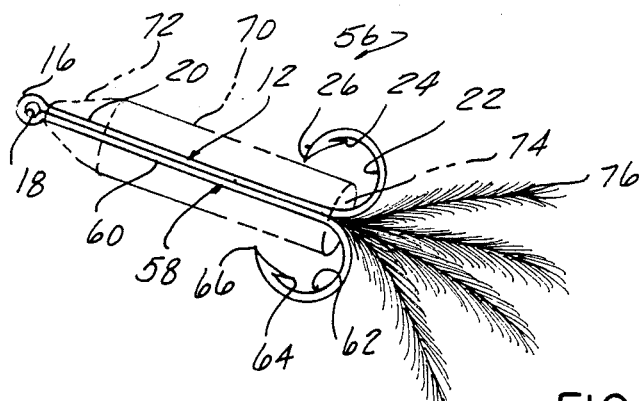
FIG. 7 is a perspective view showing yet another embodiment of the present invention.
Figure 8:
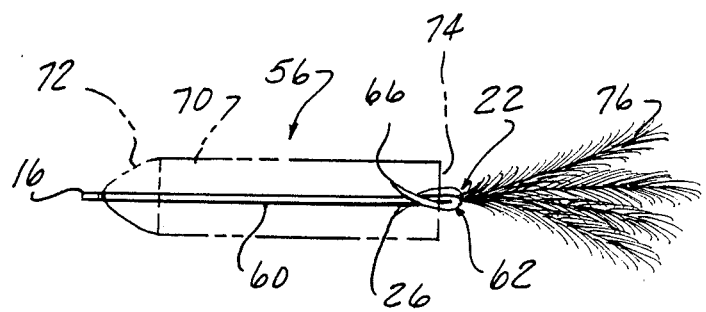
FIG. 8 is a front elevational view of the fishhook shown in FIG. 7.
Figure 9:
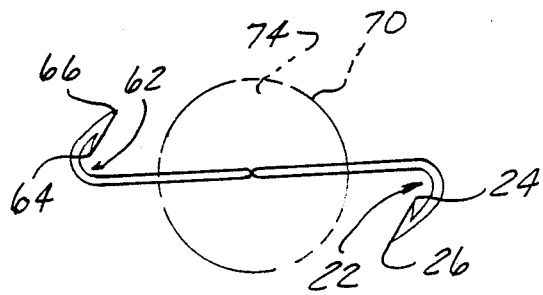
FIG. 9 is an enlarged, right-hand end view of the fishhook shown in FIG. 8, with the feathers removed for clarity.

FIGS. 7, 8 and 9 depict yet another embodiment of the present invention. The fishhook 56 shown in FIGS. 7, 8 and 9 is substantially identical to the fishhook 10 shown in FIGS. 1–5. The main difference between the fishhook 56 and the fishhook 10 is that the shanks of the two fishhook portions of the fishhook 56 are of equal lengths.

The fishhook 56 includes a first fishhook portion 12 which includes a first shank 20 having a generally straight shape extending from an eye 16 at one end. The first fishhook portion 12 also includes an offset, bottom curved bend 22, a barb 24 and a hook point 26.

The second fishhook portion 58 of the fishhook 56 includes a shank 60, an offset, bottom curved bend portion 62, a barb 64 and a hook point 66.

The shanks 20 and 60 of the first and second hook portions 12 and 58, respectivey, are arranged side-by-side in parallel. The space between the shanks 20 and 60 may be closed by solder or other suitable means to form a rigid, unitary structure. As noted above, the shanks 20 and 60 have equal lengths such that the bottom curved bend portions 22 and 62, respectively, are arranged side-by-side at one end of the shanks 20 and 60.

The planar arrangement of the offset bend portions 22 and 62 with respect to a plane through the shanks 20 and 60 of the first and second hook portions 12 and 58, respectively, is identical to that described above for the fishhook 10 shown in FIGS. 1–5. Thus, the first offset bottom curved bend portion 22 of the first hook portion 12 curves concavely from a first plane formed by the first and second shanks 20 and 60, respectively. The curving forms a second plane at an angle to the first plane and causes the bottom curved bend of the first offset bend 22 to be on one side of the first plane and the first hook point 26 to be on the opposite side of the first plane.

The second offset bottom curved bend 62 formed in the second hook 58 curve concavely from the first plane, with the curving forming a third plane at an angle to the first plane symmeytrically opposite to the second plane relative to the first plane and causing an opposite planar effect with the first offset bend 22. The bottom curved bend of the second offset bend 62 is on one side of the first plane and the second hook point 66 is on the opposite side of the first plane through the shanks 20 and 60.

The angles of the second and third planes formed by the bottom curved bends of the first and second hooks 12 and 58, respectively, relative to the first plane are equal. Likewise, a gap spaced between the first hook point 26 and the first shank 20 is equal to a gap space formed between the second hook point 66 and the second shank 60.

A flotation member denoted in general by reference number 70 and shown in phantom in FIGS. 7, 8 and 9 may be fixedly mounted about the fishhook 56. The flotation member 70 is formed of a suitable buoyant material, such as cork, suitable plastics, i.e. STYROFOAM, a register trademark, etc. The cylindrical shape of the flotaton member 70 is by example only as the flotation member 70 may have any other desired shape, such as square, polygonal, etc. The flotation member 70 is fixedly mounted about the shanks 20 and 60 of the fishhook 56 by an interference fit and extends from the eye 16 to the start of the offset bends 22 and 62 of the fishhook 56.

The flotation member 70 has a tapered or conical front end 72 located adjacent the eye 16 of the fishhook 56. The flotation member 70 preferably has a circular cross-section extending from the front end 72 which terminates in a flat back end 74.

The diameter of the flotation member 70 is selected such that the back end 74 fits within the gap spaces between the hook points 26 and 66 and the respective shanks 20 and 60. As shown in FIG. 9, the flotation member 70 fills approximately one-half of the gap spaces. This leaves a sufficient amount of the offset bends 22 and 62 extending outward beyond the peripheral surface of the flotation member 70 to cause the desired spinning of the fishhook 56 as described above.

For added visual enhancement of the fishhook 56, a suitable dressing, such as hackle feathers 76, may be attached to the fishhook 56. Further, alternating, spiral stripes, not shown, may be applied to the exterior of the flotation member 70 in various colors.

The flotation member 70 causes the fishhook 56 to float in the surface film of the water with approximately one-half of the flotation member 70 submerged in the water. However, when the fishhook 56 is reeled in or when water flows past the fishhook 56, the bends 22 and 62 cause the fishhook 56 to spin as described above. The flotation member 70 likewise spins and moves randomly about the surface of the water and in and out of the water which causes splashes and noise which are useful in attracting fish to the fishhook 56. This enhances the catching ability of the fishhook 56 while maintaining the desired spinning action of the fishhook 56 as it is being reeled in through the water.

In summary, there has been disclosed a unique tandem double offset fishhook which uniquely provides a spinning action as the fishhook is drawn through the water while being reeled in without the need for additional spinning or blade accessories. The fishhook of the present invention is of simple construction and may be formed utilizing conventional fishhook construction techniques.

What is claimed is:

1. A fishhook comprising:
   an eye;
   a first hook including a first shank having a predetermined length extending from and connected to the eye;
   a second hook including a second shank having a predetermined length equal to the length of the first hook extending from and connected to the eye;
   the shanks of the first and second hooks disposed side-by-side in parallel;
   a first offset bottom curved bend formed in the first hook and terminating in a first hook point; the first offset bend curving concavely from a first plane formed by the first and second shanks, the curving forming a second plane at an angle to the first plane and causing the bottom curved bend of the first offset bend to be on one side of the first plane and the first hook point to be on the opposite side of the first plane;
   a second offset bottom curved bend formed in the second hook and terminating in a second hook point, the second offset bend curving concavely from the first plane, the curving of the second offset bend forming a third plane at an angle to the first plane symmetrically opposite to the second plane relative to the first plane and causing an opposite planar effect with the first offset bend, wherein the bottom curved bend of the second offset bend is on one side of the first plane and the second hook point is on an opposite side of the first plane;
   the angles of the second and third planes formed by the bottom curved bends of the first and second hooks relative to the first plane being equal; and
   a gap space between the first hook point and the first shank being equal to a gap space between the second hook point and the second shank.

2. The fishhook of claim 1 wherein:
   the eye, the first hook and the secong hook are integrally formed from a single elongated wire.

3. The fishhook of claim 1 wherein:
   the first and second shanks are solidly joined together along the extent of their adjoining lengths.

4. The fishhooks of claim 1 further including:
   a flotation member formed of a buoyant material mounted about the first and second shanks between the eye and the first and second offset, bottom curved bends.

5. The fishhooks of claims 4 wherein:
   the flotation member has a tapered end adjacent the eye.

6. The fishhook of claim 5 wherein:
   the flotation member has a diameter at an end opposite the tapered end less than the combined gap spaces between the first and second hook points and the first and second shanks so as to fit between the first and second hook points, with a portion of the first and second offset bottom curved bends extending outward the peripheral extent of the flotation member.

* * * * *